United States Patent
Joseph et al.

(10) Patent No.: US 11,293,278 B2
(45) Date of Patent: Apr. 5, 2022

(54) VALVE POSITION SENSING USING ELECTRIC AND MAGNETIC COUPLING

(71) Applicant: Halliburton Energy Services, Inc., Houston, TX (US)

(72) Inventors: Joseph Chakkungal Joseph, The Woodlands, TX (US); Paul Gregory James, Spring, TX (US); Ziquan Wang, Houston, TX (US); Ravi Sharad Vayeda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 24 days.

(21) Appl. No.: 16/855,134

(22) Filed: Apr. 22, 2020

(65) Prior Publication Data

US 2021/0332669 A1    Oct. 28, 2021

(51) Int. Cl.
| E21B 47/092 | (2012.01) |
| E21B 34/06 | (2006.01) |
| E21B 34/14 | (2006.01) |
| E21B 34/16 | (2006.01) |
| F16K 31/08 | (2006.01) |
| F16K 37/00 | (2006.01) |

(52) U.S. Cl.
CPC .......... *E21B 47/092* (2020.05); *E21B 34/066* (2013.01); *E21B 34/14* (2013.01); *E21B 34/16* (2013.01); *F16K 31/082* (2013.01); *F16K 37/0033* (2013.01)

(58) Field of Classification Search
CPC ........ E21B 34/066; E21B 34/16; E21B 34/14; F16K 37/0033; F16K 31/082
See application file for complete search history.

(56) References Cited

U.S. PATENT DOCUMENTS

| 4,064,451 A | 12/1977 | Foxworthy |
| 4,601,354 A | 7/1986 | Campbell et al. |

(Continued)

FOREIGN PATENT DOCUMENTS

| KR | 100881615 | 1/2009 |
| KR | 200450652 | 10/2010 |

OTHER PUBLICATIONS

International Search Report and Written Opinion for Application No. PCT/US2020/030771, dated Jan. 15, 2021.

*Primary Examiner* — Michael R Wills, III
(74) *Attorney, Agent, or Firm* — Scott Richardson; C. Tumey Law Group PLLC (57) ABSTRACT

A system and method for identifying a position of a sliding sleeve. The system may comprise an outer housing, a sliding sleeve within the outer housing, one or more magnetic switches, and a magnet. A method may comprise closing a switch within a magnetic switch disposed with a magnet, wherein the magnetic switch is disposed downhole, and transmitting an electric current into a first electric branch, wherein the electric current traverses through first electric branch, through the magnetic switch, to a second electric branch, and to a node. The method may further comprise measuring the electric current or voltage at the node and identifying a position of a sliding sleeve in an outer housing from the measurement. The method may further comprise calibrating a linear resistor position sensor assembly based at least in part on the measurement.

19 Claims, 6 Drawing Sheets

(56) References Cited

U.S. PATENT DOCUMENTS

| | | | |
|---|---|---|---|
| 5,666,050 A * | 9/1997 | Bouldin | G01B 7/003 |
| | | | 324/207.26 |
| 6,078,154 A | 6/2000 | Manlove et al. | |
| 6,262,647 B1 | 7/2001 | Rogers et al. | |
| 6,877,558 B2 | 4/2005 | Connell et al. | |
| 8,237,443 B2 | 8/2012 | Hopmann et al. | |
| 8,636,054 B2 * | 1/2014 | Smithson | E21B 34/06 |
| | | | 166/65.1 |
| 9,714,042 B1 | 7/2017 | Dibble et al. | |
| 9,771,778 B2 * | 9/2017 | O'Connor | H01H 1/065 |
| 2006/0124310 A1 | 6/2006 | Lopez De Cardenas et al. | |
| 2009/0128141 A1 * | 5/2009 | Hopmann | E21B 47/092 |
| | | | 324/207.24 |
| 2011/0056288 A1 | 3/2011 | Smithson et al. | |
| 2011/0248566 A1 * | 10/2011 | Purkis | E21B 47/13 |
| | | | 307/40 |
| 2016/0208579 A1 * | 7/2016 | Delzell | E21B 41/00 |
| 2017/0321485 A1 | 11/2017 | Bhosle et al. | |
| 2018/0347313 A1 | 12/2018 | Joseph et al. | |
| 2019/0071960 A1 | 3/2019 | James et al. | |
| 2020/0116269 A1 | 4/2020 | El Mallawany et al. | |
| 2021/0115759 A1 * | 4/2021 | Ng | E21B 34/12 |

\* cited by examiner

VALVE POSITION SENSING USING ELECTRIC AND MAGNETIC COUPLING

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During production operations, different tools may be disposed downhole on production tubing to control the flow of desirable fluids from a formation. In examples, downhole tools may have valves that actuate using sleeves. Currently, determining if the valve is open or closed, is determined through a linear variable resistor. The linear variable resistor requires manual calibration, has de-coupling problems, hysteresis in measurements, and is less reliable due to more moving parts.

BRIEF DESCRIPTION OF THE DRAWINGS

These drawings illustrate certain aspects of some examples of the present disclosure and should not be used to limit or define the disclosure.

DETAILED DESCRIPTION

Systems and methods discussed below may be directed to a system and method for determining the linear movement and position of any moving mechanism within a downhole tool. As an example, the methods described below could be used for determining the movement and position of a sliding sleeve in a sliding sleeve valve. The sliding sleeve is configured to "open" and "close" the valve, based at least in part on the position of the sliding sleeve. Identifying the position of the sliding sleeve allows for personnel to determine if the sliding sleeve valve is open or closed. Currently, determining the location of a valve position is accomplished through the use of a linear variable resistor housed in an atmospheric chamber with the slider magnetically coupled to the sliding sleeve to measure position. This system and methods are subject to a number of shortcomings. Specifically, these shortcomings are first, position vs resistance values must be calibrated manually for each installation, which is time consuming and expensive. Second, magnets utilized in the linear variable resistor are subject to de-coupling and losing all position measurements. Additionally, a magnetic coupling system, the linear variable resistor, is subject to significant hysteresis in measurement, to such a degree that accuracy suffers significantly when used for bi-directional measurement. Common solution for fixing, such as increasing coupling strength cannot be implemented without increasing the drag and friction within the linear resistance device. Discussed below are systems and method for determining the location of a sliding sleeve that do not have the shortcomings of a linear variable resistor.

Figure 1:
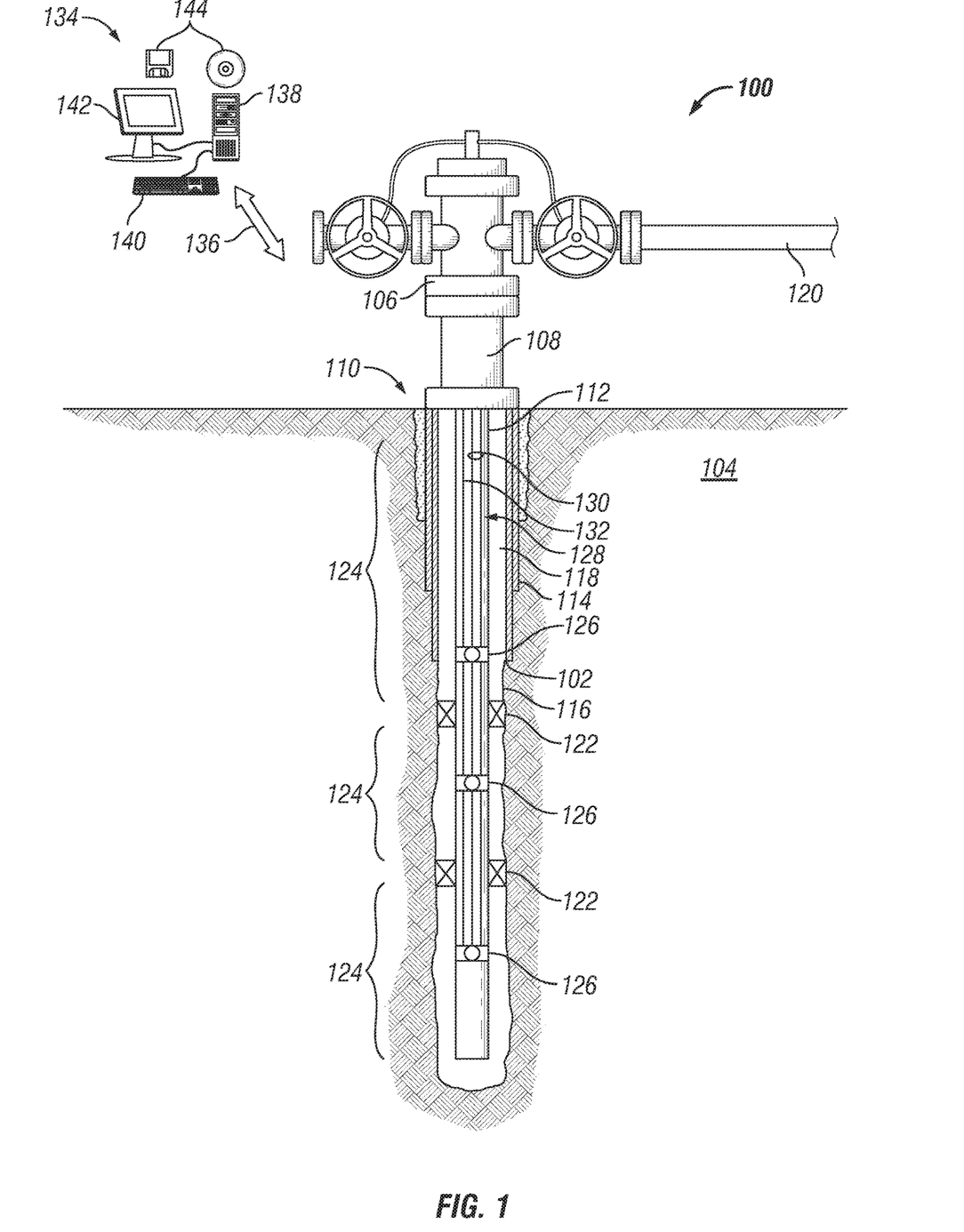
FIG. 1 illustrates an example of a production fluid recovery system.

For example, the use an array of magnetic switches (a magnetic reed switch could be embodied by a magnetic reed switch, a hall effect sensor, a capacitive switch, or magnetoresistive element) to eliminate the moving part (racecar) and therefore the hysteresis. The magnetic reed switches may be used to detect discrete positions, or could be added to a resistor network. If the magnetic reed switches are close enough, then the primary magnet may activate multiple switches. In this case, continuous positions could be detected with an appropriate algorithm. These systems and methods may reduce the number of moving parts leading to ease of manufacturing, reduce manufacturing and operation time by eliminating multiple calibration process, and increase reliability and accuracy of measurements, FIG. 1 illustrates a well system 100 with isolated production zones. Well system 100 may comprise a wellbore 102 formed within a formation 104. Wellbore 102 may be a vertical wellbore as illustrated or it may be a horizontal and/or a directional well. While well system 100 may be illustrated as land-based, it should be understood that the present techniques may also be applicable in offshore applications. Formation 104 may be made up of several geological layers and include one or more hydrocarbon reservoirs. As illustrated, well system 100 may include a production tree 106 and a wellhead 108 located at a well site 110. A production tubing 112 may extend from wellhead 108 into wellbore 102, which may traverse formation 104.

Without limitation, wellbore 102 may be cased with one or more casing segments 114. Casing segments 114 help maintain the structure of wellbore 102 and prevent wellbore 102 from collapsing in on itself. In some embodiments, a portion of the well may not be cased and may be referred to as "open hole." The space between production tubing 112 and casing segments 114 or wellbore wall 116 may be an annulus 118. Production fluid may enter annulus 118 from formation 104 and then may enter production tubing 112 from annulus 118 through sliding sleeve valve 126. Production tubing 112 may carry production fluid uphole to production tree 106. Production fluid may then be delivered to various surface facilities for processing via a surface pipeline 120.

Wellbore 102 may be separated into a plurality of zones with packers 122 disposed in annulus 118. Packers 122 may separate wellbore 102 into zones 124. At least a portion of production tubing 112 may be disposed within at least one zone 124 and at least one sliding sleeve valve 126 may be disposed in zone 124. During operations, when sliding sleeve valve 126 is open, fluid may flow from the respective zone 124 into production tubing 112. When a sliding sleeve valve 126 is closed, fluid from the respective zone 124 is prevented from flowing into production tubing 112. Thus, the flow of formation fluid from each zone 124 into production tubing 112 may be controlled through the actuation of a sliding sleeve valve 126. In examples, the flow of fluid may be increased or decrease incrementally by "choking" a sliding sleeve valve 126. Choking a sliding sleeve valve 126 may be defined as partially opening or partially closing a sliding sleeve valve 126. During operations, a sliding sleeve valve 126 may be at least partially open or at least partially closed by twenty five percent, fifty percent, or seventy five percent. Additionally, production tubing valves 126 may be fully opened, fully closed, or positioned between one percent and ninety nine percent open or closed.

In some examples, sliding sleeve valve 126 may be operated hydraulically and controlled by a valve control system 128. Valve control system 128 comprises a hydraulic system, discussed below, with two hydraulic lines 130 and an electrical system with an electrical line 132. Additionally, valve control system 128 may be connected to an information handling system 134 through connection 136, which may be wired and/or wireless. Systems and methods of the present disclosure may be implemented, at least in part, with information handling system 134. Information handling system 134 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 134 may be a processing unit 138, a network storage device, or any other suitable device and may vary in size, shape, performance, functionality, and price. Information handling system 134 may include random access memory (RAM), one or more processing resources such as a central processing unit (CPU) or hardware or software control logic, ROM, and/or other types of nonvolatile memory. Additional components of the information handling system 134 may include one or more disk drives, one or more network ports for communication with external devices as well as an input device 140 (e.g., keyboard, mouse, etc.) and video display 142. Information handling system 134 may also include one or more buses operable to transmit communications between the various hardware components.

Alternatively, systems and methods of the present disclosure may be implemented, at least in part, with non-transitory computer-readable media 144. Non-transitory computer-readable media 144 may include any instrumentality or aggregation of instrumentalities that may retain data and/or instructions for a period of time. Non-transitory computer-readable media 144 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 2:
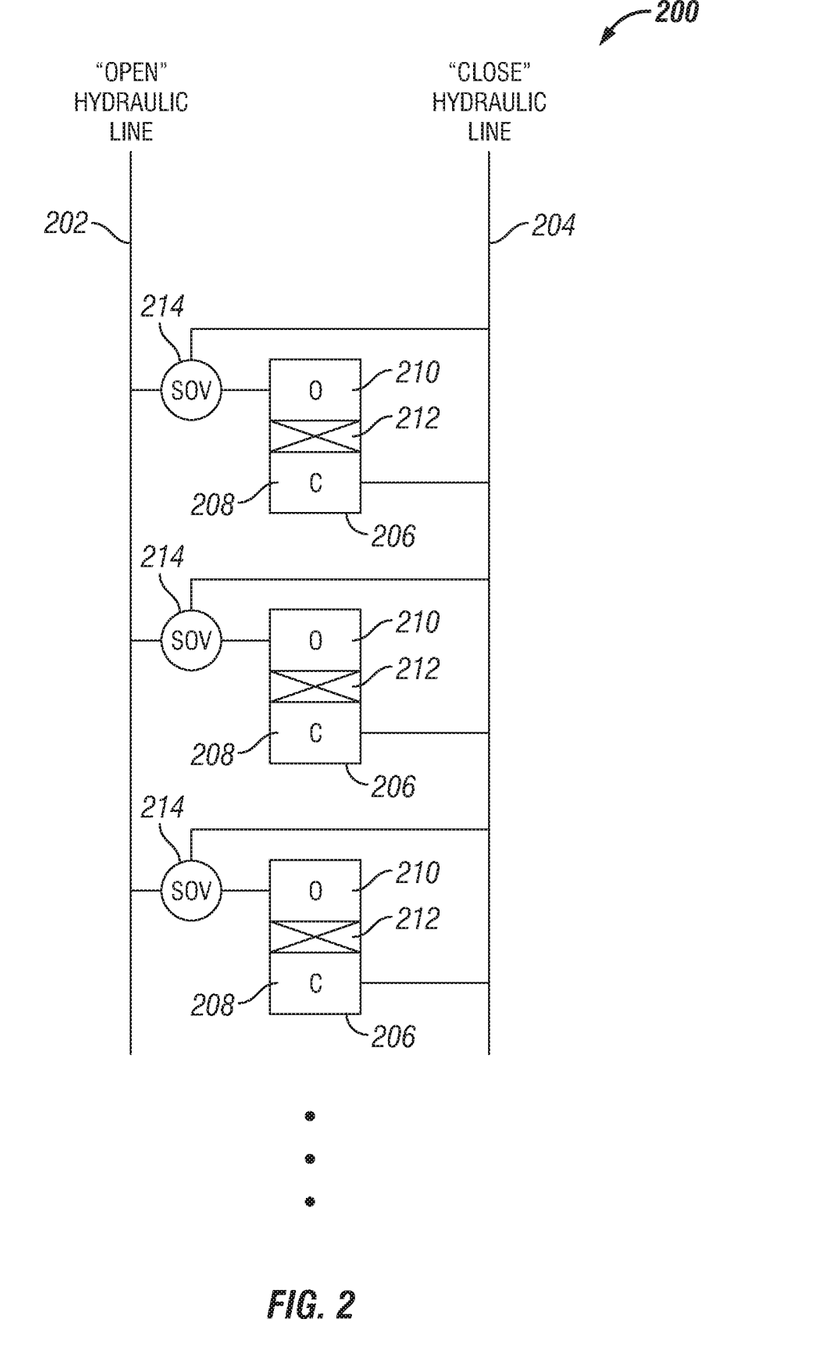
FIG. 2 illustrates a schematic of a hydraulic system.

A schematic illustrating a hydraulic system 200 of valve control system 128 is illustrated in FIG. 2. In examples, hydraulic system 200 may control the position of a sliding sleeve valve 126 (e.g., referring to FIG. 1). Hydraulic system 200 may comprise an open hydraulic line 202, a close hydraulic line 204, and a piston device 206 coupled to each a sliding sleeve valve 126, as discussed further below piston device 206 is attached to a sliding sleeve of a sliding sleeve valve 126. During operation, the movement of piston device 206 may move the sliding sleeve in a sliding sleeve valve 126, which may incrementally open and/or close sliding sleeve valve 126. Thus, increasing hydraulic pressure through open hydraulic line 202 may move piston device 206, which in turn may move the sliding sleeve toward an open position. Increasing hydraulic pressure through closed hydraulic line 204 may move piston device 206, which in turn may move the sliding sleeve toward a closed position.

Each piston device 206 may comprise a closed chamber 208 and an open chamber 210, separated by a piston 212. Closed chamber 208 may be hydraulically coupled to closed hydraulic line 204. Open chamber 210 may be hydraulically coupled to an electrically powered device such as a solenoid operated valve ("SOV") 214 that may be coupled to both the open hydraulic line 202 and the closed hydraulic line 204. Without limitation, SOVs 214 may be replaced by motors or other devices configured to couple and/or decouple hydraulic lines similarly to the SOVs upon receiving an electric current. In addition, SOVs 214 may be replaced by motors or actuators that directly move the valve and eliminate the need for the hydraulic control lines.

Piston 212 may be configured to move when there may be a pressure differential between closed chamber 208 and open chamber 210, thereby opening and/or closing the respective a sliding sleeve valve 126 (e.g., referring to FIG. 1). Thus, in order to close sliding sleeve valve 126, the closed chamber 208 may be pressurized via closed hydraulic line 204, bleeding open chamber 210 through open hydraulic line 202. Piston 212 and the corresponding sliding sleeve valve 126 may be thereby moved into a closed position. Inversely, in order to open sliding sleeve valve 126, open chamber 210 may be pressurized via the open hydraulic line 202 and closed chamber 208 may be bled through the closed hydraulic line 204. In both cases, a pressure differential between the open hydraulic line 202 and the close hydraulic line 204 may be applied.

However, multiple piston devices 206 may be controlled on the same open hydraulic line 202 and close hydraulic line 204. During operations, to operate each a sliding sleeve valve 126 (e.g., referring to FIG. 1) independently and one at a time, one of closed chambers 208 or open chamber 210 of each piston device 206 may be coupled to an SOV 214.

When there is no electrical current flowing through an SOV 214 (e.g., SOV 214 may not actuated), open chamber 210 may be hydraulically coupled to closed hydraulic line 204 and separated from open hydraulic line 202, and thus not affected by hydraulic pressure in open hydraulic line 202. When a current may flow through SOV 214 (i.e., SOV 214 may be actuated), open chamber 210 may be connected to the open hydraulic line 202 and separated from the close hydraulic line 204. Thus, sliding sleeve valve 126 (e.g., referring to FIG. 1) may be controlled independently by actuating the corresponding SOV 214 and keeping the other SOVs 214 unactuated. SOVs 214 may be controlled via the electrical system of valve control system 200.

Figure 3:
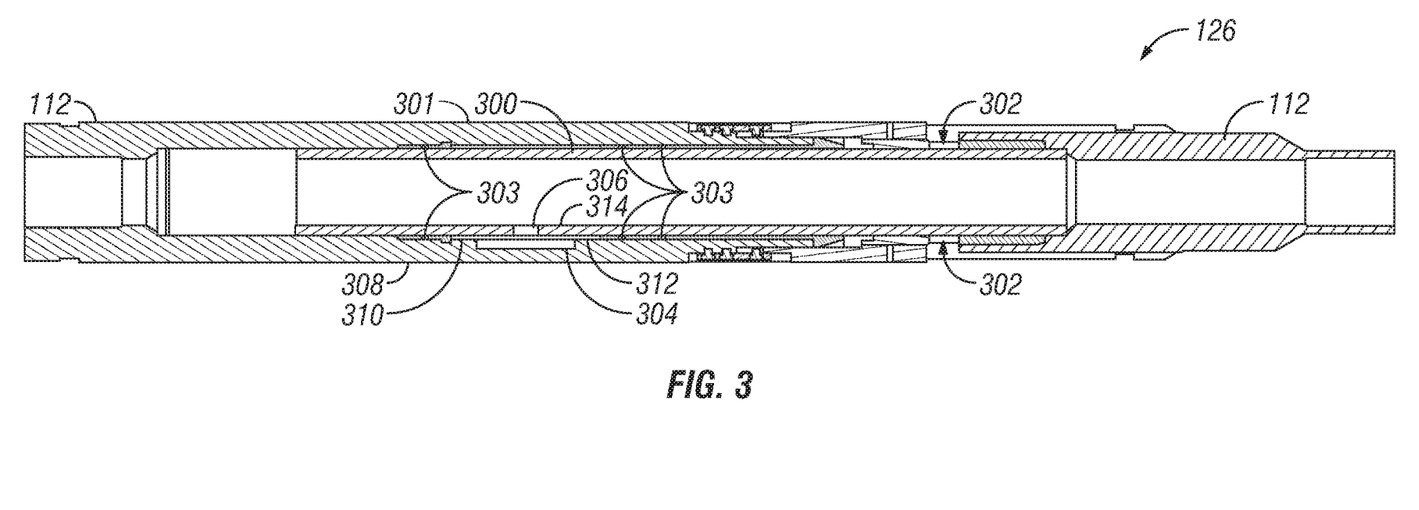
FIG. 3 illustrates an example of a sliding sleeve valve.

FIG. 3 illustrates sliding sleeve valve 126. As illustrated, a sliding sleeve 300 is disposed within an outer housing 301. Outer housing 301 is further connected to production tubing 112 at both the top and bottom of outer housing 301. Outer housing 301 may be connected to production tubing 112 by any suitable means, for example, threaded connection, press connection, and/or the like. In examples, sliding sleeve 300 is supported by one or more coupler 303, which may be a seal configured to prevent movement of fluid between outer housing 301 and sliding sleeve 300. During operations, sliding sleeve 300 may be moved axially along sliding sleeve valve 126. Movement of sliding sleeve 300 may be performed by valve control system 128 (e.g., referring to FIG. 1) and methods discussed above. Piston device 206 is shown as part of sliding sleeve 300 and outer housing 301, as defined by coupler 303. FIG. 3 illustrates sliding sleeve valve 126 in a closed position, which is defined as when sliding sleeve 300 is disposed over and obstructing fluid entrances 302. During operations sliding sleeve valve 126 may be opened by sliding sleeve 300 axially, to expose fluid entrances 302 to the interior of sliding sleeve valve 126, this may allow fluid to enter into or exit from the sliding sleeve valve 126 and production tubing 112. Likewise sliding sleeve 300 may move in the opposite direction axially to cover fluid entrances 302, preventing the movement of fluid into or out of the sliding sleeve valve 126, thus "closing" sliding sleeve valve 126.

In examples, sliding sleeve 300 may be moved to at least partially expose, or cover, fluid entrances 302. Knowing or determining the location of sliding sleeve 300 may allow for personnel to know how and how much sliding sleeve 300 should move to obtain a desired fluid flow through fluid entrance 302 and through sliding sleeve valve 126. To determine the position of sliding sleeve 300, information handling system 134 (e.g., referring to FIG. 1) may be connected to an array of magnetic switches 304 disposed within outer housing 301. In examples, information handling system 134 may be connected to array of magnetic switches 304 through wired or wireless communications. Array of magnetic switches 304 may work with magnet 306, disposed on sliding sleeve 300, to determine the position of sliding sleeve 300 relative to outer housing 301.

Array of magnetic switches 304 may be disposed within outer housing 301, along an outer edge 308 of outer housing 301, or along an inner edge 310 of outer housing 301. Additionally, magnet 306 may be disposed within sliding sleeve 300, along an outer edge 312 of sliding sleeve 300, or along an inner edge 314 of sliding sleeve 300. Although array of magnetic switches 304 and magnet 306 are illustrated between two sets of couplers 303, array of magnetic switches 304 and magnet 306 may be disposed at any suitable location along outer housing 301 and sliding sleeve 300. In examples, there may be one or more arrays of magnetic switches 304 and magnets 306 for determining the location of sliding sleeve 300 within outer housing 301.

Figure 4:
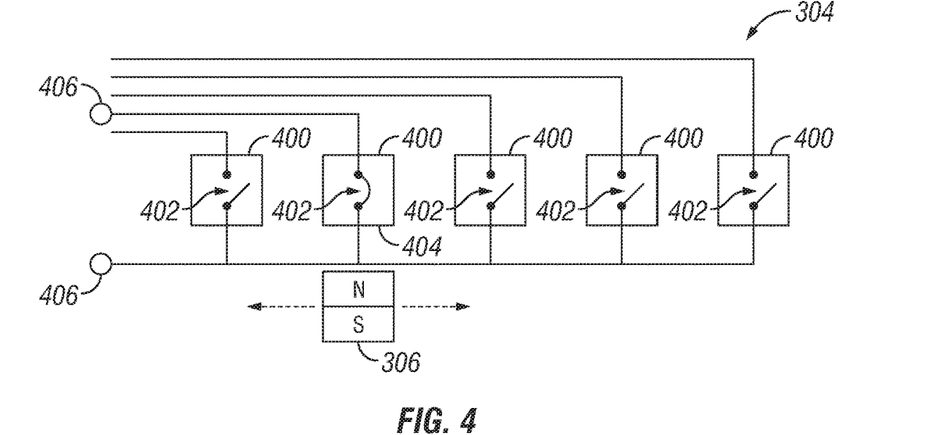
FIGS. 4-6 illustrate examples of different arrays of magnetic switches.

FIG. 4 is a schematic diagram illustrating how array of magnetic switches 304 and magnet 306 work together to determine the location of sliding sleeve 300 in outer housing 301 (e.g., referring to FIG. 1). As illustrated, array of magnetic switches 304 may include one or more magnetic switches 400. In examples, magnetic switch 400 may be a magnetic reed switch, a Hall Effect sensor, a capacitive switch, or magnetoresistive element. Magnetic switch 400 operates by closing or opening with a magnetic field. For example, magnet 306, although illustrated as not connected to sliding sleeve 300 is connected to sliding sleeve 300 as described above, creates a magnetic field. The magnetic field is formed from magnet 306 as magnet 306 is a rare earth magnet or may be an electromagnetic device. The magnetic field changes the state (for example from open state to closed state or vice versa) of switch 402 of second magnetic switch 404. All other switches 402 are in the default state. In this example, switch 402 is open, which does not allow for the flow of electrical current, while a closed switch 402 allows for the flow of electrical current. Taking a reading at nodes 406, information handling system 134 may be able to determine which magnetic switch 400 is closed by reading the electrical current at each node 406. Likewise, information handling system 134 will not be able to read electrical current if magnetic switch 400 is open. In example, each magnetic switch 400 may be disposed at a specific position within the array of magnets 304 (e.g., referring to FIG. 3). Each magnetic switch 400 corresponds to a known position of sliding sleeve 300 within sliding sleeve valve 126 (e.g., referring to FIG. 1). Identifying which magnetic switch 400 is closed, or open, allows for the identification of where sliding sleeve 300 is disposed in outer housing 301 (e.g., referring to FIG. 1).

Figure 5:
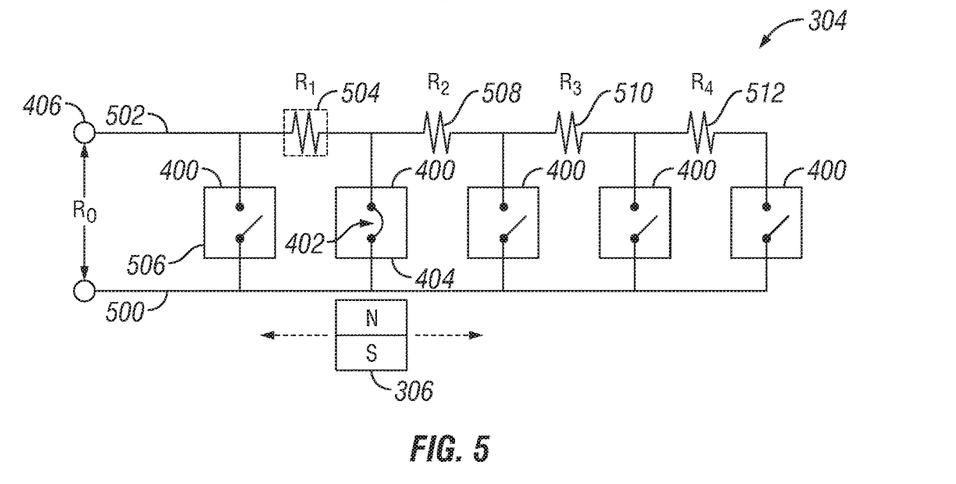

FIG. 5 illustrates another schematic diagram for determining which magnetic switches 400 are closed or open. As illustrated, magnet 306 is creating a magnetic field that is affecting second magnetic switch 404, closing switch 402 within second magnetic switch 404. Thus, electrical current may run through first electric branch 500 and flow through second magnetic switch 404 to second electric branch 502. As illustrated, a first resistor 504 is disposed between first magnetic switch 506 and second magnetic switch 404 on second line 502. Similarly, resistors 508, 510, and 512 are positioned between individual magnetic switches 400. To determine which magnetic switch 400 or magnetic switches 400 that are closed, information handling system 134 may take a measurement at nodes 406. As illustrated, the closer a "closed" switch is to nodes 406, the less resistance is encountered.

For example, if first magnetic switch 506 is closed, electrical current will traverse through first electric branch 500, through first magnetic switch 506 to second electric branch 501. The measurements at each node 406 may be nearly identical, thus no resistance is encounters and the reading of the electrical current identifies that first magnetic switch 506 is closed. If second magnetic switch 404 is closed, electrical current will traverse through first electric branch 500, through second magnetic switch 404 to second electric branch 501 and through first resistor 504 to node 406.

Figure 9:
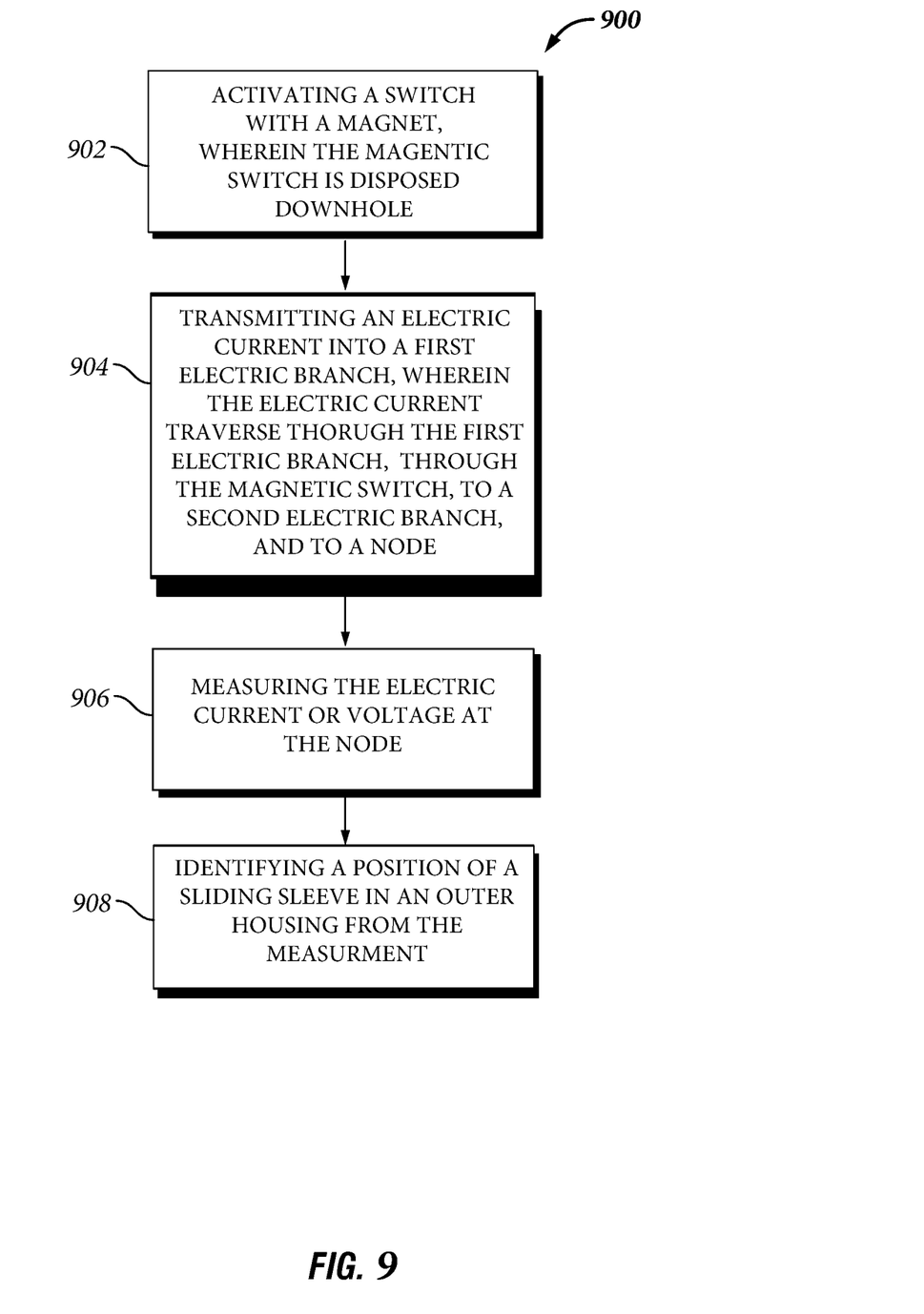
FIG. 9 is a workflow for identifying a position of a sliding sleeve in an outer housing.

FIG. 9 illustrates workflow 900 for identifying a position of sliding sleeve 300 (e.g., referring to FIG. 3) by measuring the electrical current at first electric branch 500 and second electric branch 502. Workflow 900 may begin with block 902. In block 902, switch 402 (e.g., referring to FIG. 5) is activated with a magnet 306 (e.g., referring to FIG. 5), wherein the switch 402 is disposed downhole. Magnet 306 may activate switch 402 using a magnetic or electromagnetic field as switch 402 may be a magnetic switch. In block 904, an electric current is transmitted through first electrical branch 500 (e.g., referring to FIG. 5), where the electric current traverses through the first electric branch 500, through switch 402 to second electrical branch 502, and to a node 406. As discussed above in FIG. 5, resistors may reduce the electrical current. In block 906, the electric current or voltage is measured at the node 406. In examples, the electrical current is measured at both first electrical branch 500 and second electrical branch 502. In block 908, a position of a sliding sleeve is identified in an outer housing from the measurement in block 906. The difference in the electrical current measurement at first electrical branch 500 and the electrical current measurement at second electrical branch 502 may be used to determine which switch 402 is activate. Thus, the more resistors the electrical current encounters, the larger the drop or difference between the measurements at the first electrical branch 500 and second electrical branch 502.

For example, first resistor 504 has a resistance that will reduce the electrical current moving through first resistor 504. Thus, the measurement at each node 406 will be different based at least in part on first resistor 504. This electrical current reading identifies that second magnetic switch 404 is closed.

Figure 6:
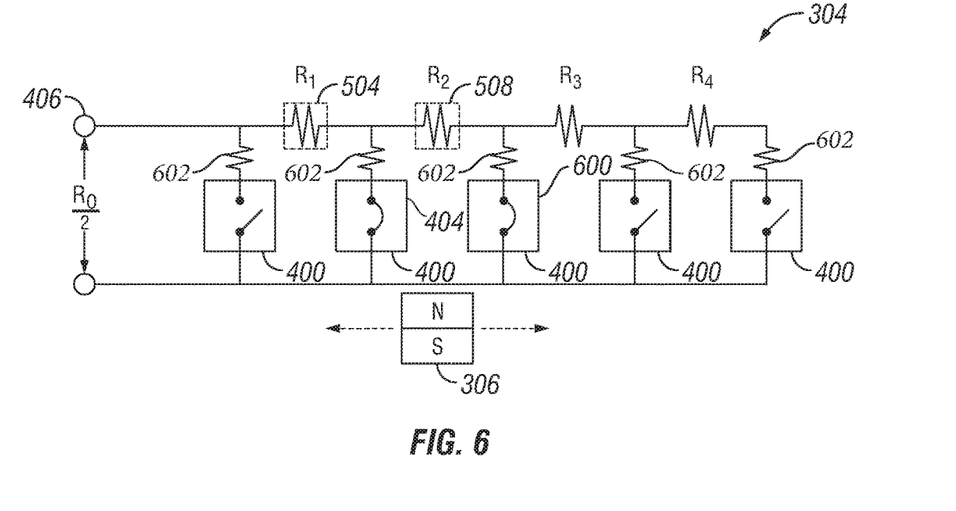

FIG. 6 illustrates another example in which magnet 306 is disposed between second switch 404 and third magnetic switch 600. The magnetic field created by magnet 306 may close both second magnetic switch 404 and third magnetic switch 600. As illustrated, as second magnetic switch 404 is closed, electrical current will traverse through first electric branch 500, through second magnetic switch 404 to second electric branch 501. Additionally, as third magnetic switch 600 is closed, electrical current will traverse through first electric branch 500, through third magnetic switch 600 to second electric branch 501. The electrical current measured at node 406 will be reduced from the resistance provided by first resistor 504 and second resistor 508. Additionally, in this example in-line resistors 602 may be disposed after each magnetic switch 400. This measurement will indicate that magnet 306 is disposed between second magnetic switch 404 and third magnetic switch 600. Opening and closing multiple magnetic switches 400 allows for the identification of the location of magnet 306, which in turn, allows for the identification of the location of sliding sleeve 300 within outer housing 301 (e.g., referring to FIG. 3).

Figure 7:
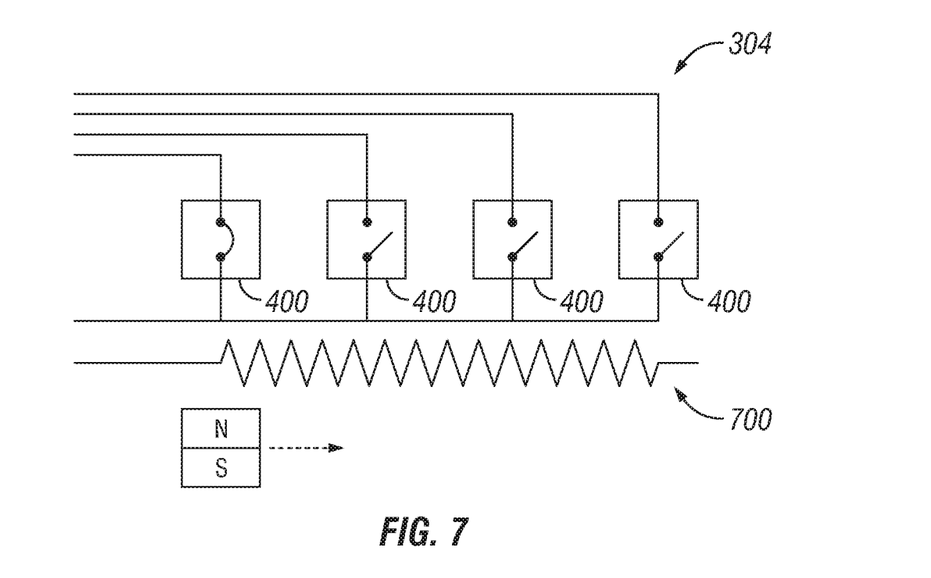
FIG. 7 illustrates a schematic for calibration of a linear resistor position sensor assembly.
Figure 8:
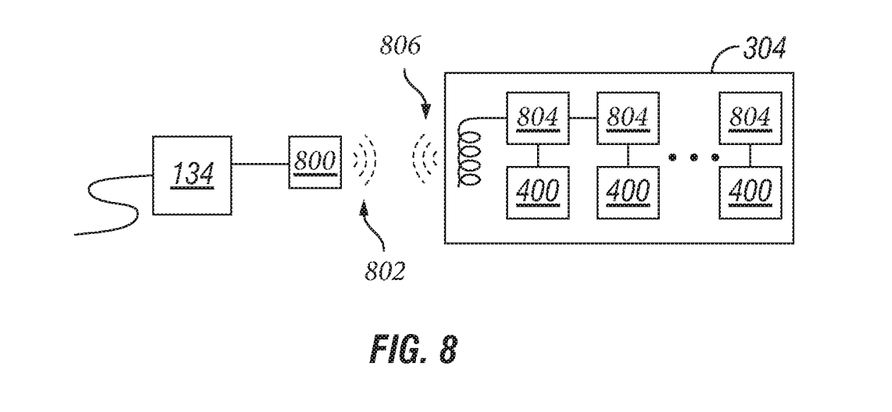
FIG. 8 illustrates an example of an array of magnetic switches using radio-frequency identification tags.

As discussed above, an array of magnetic switches 304 may be utilized to replace a linear resistor position sensor assembly. However, as illustrated in FIG. 7, array of magnetic switches 304 may be utilized in conjunction with linear resistor position sensor assembly 700 to calibrate linear resistor position sensor assembly 700. This may be performed by reading a position of linear resistor position sensor assembly 700, comparing that position to a closed or open magnetic switch 400 and altering the linear resistor position sensor based on calibration data to correspond to the known position of magnetic switch 400. To improve the accuracy of the calibration across the range, this may be carried out at more than one magnetic switch 400. Furthermore, this calibration may be performed by information handling system 134 (e.g., referring to FIG. 1). For example, when information handling system 134 detects a change in operating conditions, such as temperature, drift over time, component degradation, etc. the methods described above for calibration may be implemented by information handling system 134 automatically or manually to calibrate the position of the linear resistor position sensor assembly 700. FIG. 8 is a schematic illustration for the communication of information from the array of magnetic switches 304 communicates with information handling system 134. In this example, a radio-frequency (RF) antenna 800 broadcast an RF signal 8 to the array of magnetic switches 304, which is downhole on sliding sleeve valve 126 (e.g., referring to FIG. 1), as described above. RF antenna 800 may be disposed on the surface or downhole and connected to information handling system 134 by any suitable means. Additionally, information handling system 134 may also be disposed on the surface or downhole. RF signal 802 may activate radio-frequency identification (RFID) tags 804. Each magnetic switch 400 may be connected to a single RFID tag 804. Each RFID tag 804 may only be activated if magnetic switch 400 is closed. If magnetic switch 400 is closed, RF signal 802 may energized the attached RFID tag 804, which will transmit a return signal 806 that may be recorded by RF antenna 800. This may allow for the identification of which magnetic switches 400 are closed and/or open in real-time. Thus, allowing for the identification of the position of sliding sleeve 300 within outer housing 301 of sliding sleeve valve 126 (e.g., referring to FIG. 1), as discussed above.

The methods and systems described above increase accuracy and reliability of reading the position of sliding sleeve 300 in sliding sleeve valve 126 (e.g., referring to FIG. 3). The systems and methods discussed above provide improvements over current technology that eliminate error in position sensing, make position sensing insensitive to temperature (and possibly pressure) changes, eliminate the need for complex and expensive calibration process, enable the system to read position in both directions, and eliminate multiple connections and increase reliability. Additionally, in the event that wireless intelligent completions are developed, these methods have communication applications as well, meaning that they could also be used to relay the position data in addition to reading it. Deployment reliability would be improved through being able to automatically calibrate and re-calibrate the position readings in the event that position readings become questionable. These sensing systems would also allow detection of erosion shortening the length of the sleeve leading to better life predictions for the well and equipment. The systems and methods may include any of the various features of the systems and methods disclosed herein, including one or more of the following statements.

Statement 1: A sliding sleeve valve may comprise an outer housing, a sliding sleeve within the outer housing, one or more magnetic switches, and a magnet.

Statement 2. The sliding sleeve valve of statement 1, wherein the one or more magnetic switches are disposed in the outer housing and the magnet is disposed in the sliding sleeve.

Statement 3. The sliding sleeve valve of statement 1 or 2, wherein the magnet is disposed in the outer housing and the one or more magnetic switches is disposed in the sliding sleeve.

Statement 4. The sliding sleeve valve of statements 1-3, wherein each of the one or more magnetic switches are a magnetic reed switch, a hall effect sensor, a capacitive switch, or magnetoresistive element.

Statement 5. The sliding sleeve valve of statement 4, wherein the one or more magnetic switches may be an open device, a closed device, or an analog device.

Statement 6. The sliding sleeve valve of statements 1-4, wherein each of the one or more magnetic switches are attached to a first electric branch and a second electric branch.

Statement 7. The sliding sleeve valve of statement 6, wherein at least one resistor is disposed between each connection for the one or more magnetic switches to the second electric branch.

Statement 8. The sliding sleeve valve of statements 1-4 or 6, wherein a linear resistor position sensor assembly is disposed adjacent to the one or more magnetic switches.

Statement 9. The sliding sleeve valve of statements 1-4, 6, or 8, further comprising an information handling system connected to a radio-frequency antenna, wherein the radio-frequency antenna is configured to transmit a radio frequency signal to energize one or more radio-frequency identification tags connected to each of the one or more magnetic switches.

Statement 10. The sliding sleeve valve of statements 1-4, 6, 8, or 9, wherein the magnet is a rare earth magnet.

Statement 11. The sliding sleeve valve of statements 1-4, 6, or 8-10, wherein the magnet is an electromagnetic device.

Statement 12. A method may comprise activating a magnetic switch with a magnet, wherein the switch is disposed downhole, transmitting an electric current into a first electric branch, wherein the electric current traverses through first electric branch, through the switch, to a second electric branch, and to a node. The method may further comprise measuring the electric current or voltage at the node and identifying a position of a sliding sleeve in an outer housing from the measurement.

Statement 13. The method of statement 12, wherein the electric current traverse through at least one resistor.

Statement 14. The method of statements 12 or 13, wherein the magnet is a rare earth magnet.

Statement 15. The method of statements 12-14, wherein the magnet is an electromagnetic device.

Statement 16. The method of statements 12-15, further comprising transmitting a radio-frequency signal from a radio-frequency antenna connected to an information handling system, energizing a radio-frequency identification tag with the radio-frequency signal and transmitting a return signal, wherein the radio-frequency identification tag is attached to the switch.

Statement 17. A method may comprise activating a switch with a magnet, wherein the switch is disposed downhole, transmitting an electric current into a first electric branch, wherein the electric current traverses through first electric branch, through the switch, to a second electric branch, and to a node. The method may further comprise measuring the electric current or voltage at the node, identifying a position of a sliding sleeve in an outer housing from the measurement, and calibrating a linear resistor position sensor assembly based at least in part on the measurement.

Statement 18. The method of statement 17, wherein the calibrating the linear resistor position sensor assembly includes reading a first position of the linear resistor position sensor assembly, comparing the first position to a second position identified by the switch, and altering the linear resistor position sensor assembly to the second position.

Statement 19. The method of statements 17 and 18, wherein calibrating is performed with an array of magnetic switches.

Statement 20. The method of statements 17-20, wherein calibrating is performed by an information handling system manually or automatically.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A sliding sleeve valve comprising:
    an outer housing;
    a sliding sleeve slidably disposed within the outer housing, the sliding sleeve axially moveable within the outer housing to control fluid flow in relation to axial position;
    an electrical circuit comprising an array of magnetic switches axially spaced at known positions with respect to the outer housing;
    a magnet coupled to the sliding sleeve, wherein each magnetic switch is switched between an open state or a closed state in relation to how close the magnet is to the respective magnetic switch;
    an information handling system in communication with the electrical circuit configured for determining an axial position of the sliding sleeve based on the open or closed states of the magnetic switches; and
    a linear variable resistor disposed adjacent to the array of magnetic switches, wherein the information handling system is configured for determining an axial position of the sliding sleeve based on a current flow through the linear variable resistor and using the axial position determined using the array of magnetic switches to calibrate the axial position determined using the linear variable resistor.

2. The sliding sleeve valve of claim 1, wherein the one or more magnetic switches are disposed in the outer housing and the magnet is disposed in the sliding sleeve.

3. The sliding sleeve valve of claim 1, wherein the magnet is disposed in the outer housing and the one or more magnetic switches is disposed in the sliding sleeve.

4. The sliding sleeve valve of claim 1, wherein each of the one or more magnetic switches are a magnetic reed switch, a hall effect sensor, a capacitive switch, or magnetoresistive element.

5. The sliding sleeve valve of claim 4, wherein the one or more magnetic switches may be an open device, a closed device, or an analog device.

6. The sliding sleeve valve of claim 1, wherein each of the one or more magnetic switches are attached to a first electric branch and a second electric branch.

7. The sliding sleeve valve of claim 6, wherein at least one resistor is disposed between each connection for the one or more magnetic switches to the second electric branch.

8. The sliding sleeve valve of claim 1, wherein the information handling system is configured to perform the step of calibrating the axial position determined using the linear variable resistor automatically in response to a change in operating conditions.

9. A sliding sleeve valve comprising:
an outer housing;
a sliding sleeve slidably disposed within the outer housing, the sliding sleeve axially moveable within the outer housing to control fluid flow in relation to axial position;
an electrical circuit comprising an array of magnetic switches axially spaced at known positions with respect to the outer housing;
a magnet coupled to the sliding sleeve, wherein each magnetic switch is switched between an open state or a closed state in relation to how close the magnet is to the respective magnetic switch;
an information handling system in communication with the electrical circuit configured for determining an axial position of the sliding sleeve based on the open or closed states of the magnetic switches;
a radio frequency antenna in communication with the information handling system; and
a plurality of radio-frequency identification (RFID) tags each connected to a respective one of the magnetic switches such that each RFID tag may only be activated if the respective magnetic switch is closed, wherein the information handling system determines the axial position of the sleeve based on which RFID tags are activated.

10. The sliding sleeve valve of claim 9, wherein the information handling system is configured to determine which RFID tags are open and closed in real time.

11. A method comprising:
activating a switch with a magnet, wherein the switch is disposed downhole;
transmitting an electric current into a first electric branch, wherein the electric current traverses through the first electric branch, through the activated switch, to a second electric branch, and to a node;
measuring the electric current or voltage at the node;
transmitting a radio-frequency signal from a radio-frequency antenna connected to an information handling system, energizing a radio-frequency identification (RFID) tag with the radio-frequency signal and transmitting a return signal, wherein the RFID tag is attached to the switch and is activated only if the magnetic switch is activated; and
identifying a position of a sliding sleeve in an outer housing based on whether the RFID tag is activated.

12. The method of claim 11, wherein the electric current traverse through at least one resistor.

13. The method of claim 11, wherein the magnet is a rare earth magnet.

14. The method of claim 11, wherein the magnet is an electromagnetic device.

15. The method of claim 11, further comprising transmitting a radio-frequency signal from a radio-frequency antenna connected to an information handling system, energizing a radio-frequency identification tag with the radio-frequency signal and transmitting a return signal, wherein the radio-frequency identification tag is attached to the switch.

16. A method comprising:
activating a switch with a magnet, wherein the switch is disposed downhole;
transmitting an electric current into a first electric branch, wherein the electric current traverses through first electric branch, through the switch, to a second electric branch, and to a node;
measuring the electric current or voltage at the node; and
identifying a position of a sliding sleeve in an outer housing from the measurement; and
calibrating a linear variable resistor position sensor assembly based at least in part on the measurement.

17. The method of claim 16, wherein the calibrating the linear resistor position sensor assembly includes reading a first position of the linear resistor position sensor assembly, comparing the first position to a second position identified by the switch, and altering the linear resistor position sensor assembly to the second position.

18. The method of claim 17, wherein calibrating is performed with an array of magnetic switches.

19. The method of claim 18, wherein calibrating is performed by an information handling system manually or automatically.

* * * * *